March 3, 1931.  E. LATSHAW  1,795,221
SLACK ADJUSTER
Filed April 18, 1928
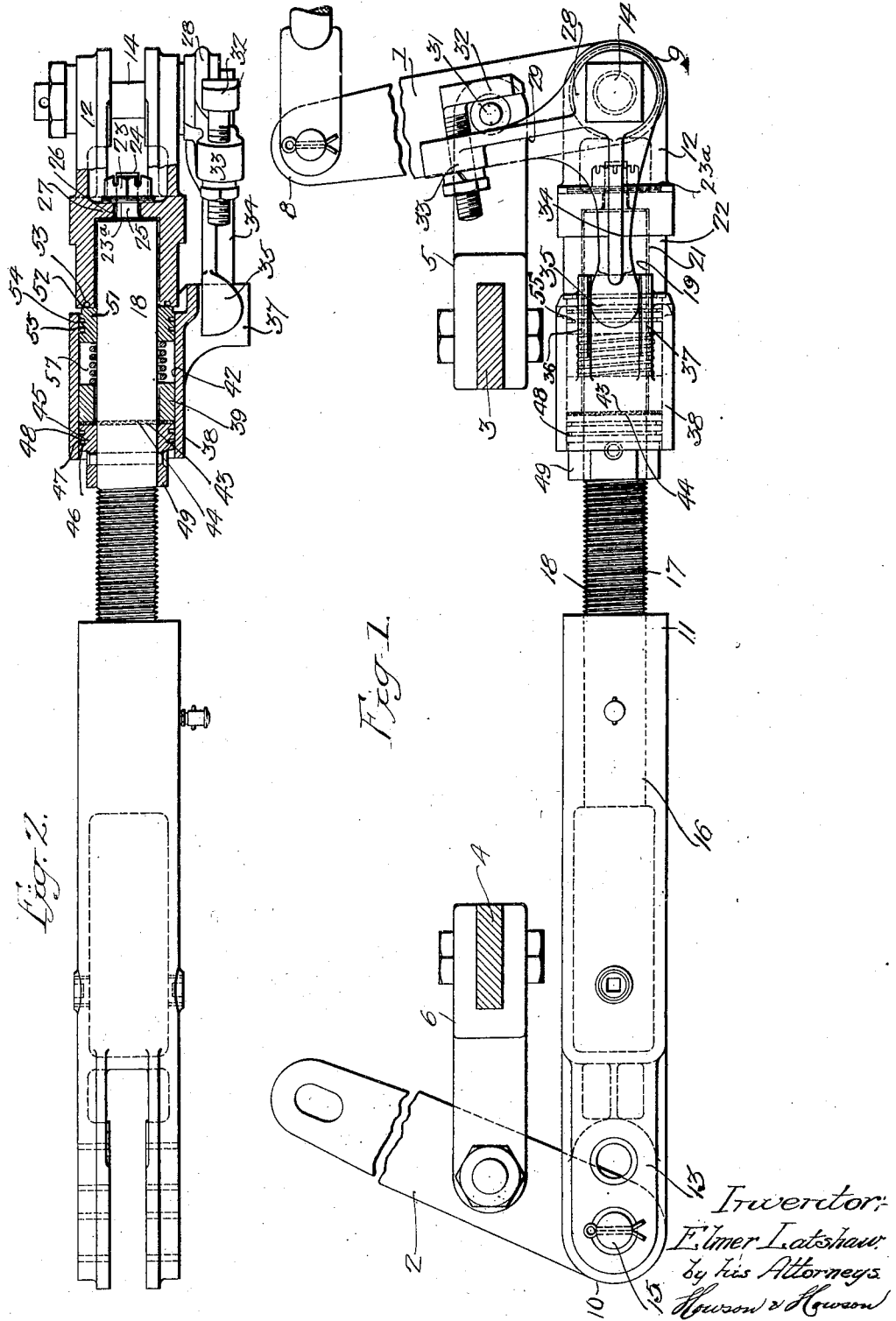

Patented Mar. 3, 1931

1,795,221

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

SLACK ADJUSTER

Application filed April 18, 1928. Serial No. 270,935.

My invention relates to slack adjusters, and it has for one object the provision of an automatic slack adjuster that shall constitute an improvement over that disclosed in the patent to Leonhauser, No. 1,631,961, dated June 14, 1927, in that it is simpler in construction, easier to repair, less expensive to manufacture and more efficient in operation.

Another object of my invention is to provide a slack adjuster, wherein the length of the connecting member may be readily shortened, as well as increased, by hand without the necessity for disconnecting the connecting member from its associated linkage, as is necessary in the aforesaid Leonhauser patent.

A further object of my invention is to provide an improved form of supporting means for the adjusting sleeve, wherein the clutch parts enclosed thereby may be more efficiently sealed against undesirable material.

A still further object of my invention is to provide an automatic slack adjuster, wherein the cushion spring, which serves to maintain the ratchet members in resilient engagement, may be prevented from being distorted when the adjusting sleeve is operated.

A still further object of my invention is to provide a slack adjuster comprising a movable member, a head for said member, an adjusting sleeve, means whereby a rotary movement of the sleeve may be imparted to the movable member, a bearing member loosely mounted on the movable member in abutting relation to the head and affording the sleeve a bearing surface, and a spring extending between said means and the bearing member, tending to prevent an axial movement of the sleeve in the direction of the head.

With these and other objects and applications in mind, my invention further consists in the details of construction and operation and arrangement, hereinafter described and claimed and illustrated in the accompanying drawing, wherein Fig. 1 is a side elevational view of an automatic slack adjuster embodying my invention; and Fig. 2 is a plan view, partly in section, of the structure of Fig. 1, omitting the live and dead levers.

Referring to the drawing, the slack adjuster therein shown comprises a pair of live and dead levers 1 and 2 which are respectively connected to the usual brake beams 3 and 4 by means of clevises 5 and 6. The live lever 1 may be actuated by means of an operating link 7 which extends from an upper end 8 thereof to the usual control apparatus (not shown). The lower ends 9 and 10 of the live lever 1 and the dead lever 2, respectively are operatively associated by means of a connecting member 11. Head members 12 and 13 of the connecting member 11 are respectively connected to the live lever 1 and to the dead lever 2 by pivot pins 14 and 15. The head member 13 is provided with a threaded boring 16 for the reception of a correspondingly threaded end portion 17 of a rotary rod 18. An opposite end portion 19 of the rod 18 is extended into a boring 21 formed in an adjacent end portion 22 of the head member 12, thereby affording the rod 18 a rotatable mounting at one end thereof.

The rod 18 may be rotatably locked to the head member 12 against relative longitudinal movement by means of a nut 23 which is mounted on a threaded end 24 of a projecting portion 25 of the rotary rod 18. The projecting portion 25 extends through an aperture 26 in a wall 27 of the head member 12 and through spring plate 23a. Movement of the rod 18 relative to the head 12 in one direction is prevented by the nut 23 engaging one side of the wall 27, while an opposite movement is prevented by the end of the rod 18 engaging the opposite side of the wall 27. The rod, however, may be readily detached from the head 12 merely by removing the nut 23.

My invention further contemplates the provision of means, whereby the spacing of the heads 12 and 13, and consequently the brake beams 5 and 6, may be automatically controlled when the movement of the live and dead levers 1 and 2 exceeds a predetermined value. To this end, I provide a bell-crank member 28 which is pivotally mounted on the pin 14, one arm 29 being in operative relation to one side of a pin 31 which is mounted on the live lever 1. An opposite side of the pin 31 is in operative relation to an arm 32 adjustably mounted on an outer end portion 33 of the arm 29. The spacing of the arms 29 and 32 is such that the fulcrumed member 28 is actuated only when the movement of the live lever 1 exceeds that necessary for normal operation of the brake beams 5 and 6.

Another arm 34 of the bell-rank lever 28 is provided with a ball end portion 35 which fits between spaced side walls 36 and 37 extending outwardly from the adjacent end portion of a cylindrical adjusting sleeve 38. The adjusting sleeve 38 is provided with a ring member 39 which is rigidly secured to an inner surface 42 thereof. The inner diameter of the ring member 39 is slightly greater than the outer diameter of the rod end portion 18 so as to be in spaced relation thereto, thereby decreasing the number of bearing surfaces and consequently the problem of lubrication. One end face of the ring member 39 is provided with ratchet teeth 43 which co-act with ratchet teeth 44 formed on an adjacent end face of a member 45 rigidly secured to the rotary rod 18. While ratchet teeth 43, 44 have been specified, any other form of clutch device may be employed, wherein a turning of the sleeve member 38 in one direction causes a corresponding movement of the rotary member 18, but an opposite movement of the adjusting sleeve 38 fails to cause the actuation of the rotary member 18.

The ratchet member 45 is provided with a bearing surface 46 for the adjacent end portion of the adjusting sleeve 38, so that the sleeve 38 may be suitably supported adjacent to the ratchet teeth 43, 44. The passage of foreign material between the adjusting sleeve 38 and the bearing surface 46 into the ratchet teeth 43, 44 is prevented by means of a grease seal 47 which may be formed in the bearing surface 46. This seal may comprise a plurality of spaced circular grooves 48 which are packed with grease. The ratchet member 45 is provided with a portion 49 which extends beyond the outer end of the adjusting sleeve 38 and is hexagonal in form, permitting the same to be readily gripped by a wrench or other tool and the rod 18 then turned by hand, in the event that it is desired to adjust manually the space between the heads 12 and 13 and consequently the brake beams 5 and 6.

The end of the adjusting sleeve, 38, which is associated with the ball end 35 of the lever arm 34, may be supported by means of a bearing ring 51 which is loosely mounted on the rod 18 within the adjusting sleeve 38 and positioned with one side thereof in abutting relation with a bearing surface 52 constituting an end wall of the supporting head 12. A grease seal is formed in the bearing surface 52 by means of a circular groove 53 which is filled with grease, thereby preventing the passage of foreign material between the bearing member 51 and the supporting head 12 to the adjacent portion of the rotary member 18.

The ring member 51 is also provided with a bearing surface 54 on the periphery thereof which affords the adjacent end portion of the sleeve 38 a desired support. Foreign material may be prevented from working between the adjusting sleeve 38 and the ring 51 by means of a grease seal which is formed in the bearing surface 54, this seal comprising a plurality of spaced circular grooves 55 which are filled with grease. The grease seals in the spaced bearing surfaces 46 and 54 for the adjusting sleeve 38 thus prevent undesirable foreign material from reaching the ratchet teeth 43, 44, as well as other rotary portions of the apparatus contained within the housing sleeve 38.

A resilient engagement may be maintained between the teeth 43, 44 of the ratchet members 42 and 43 by means of a spring 57, which encircles the rod 18, one end of the spring abutting against the rigid ratchet member 42 and the other abutting against the bearing ring 51. Since the ring 51 is loosely mounted on the rod 18, distortion of the spring 57 is prevented when the adjusting sleeve 38 is turned. The ring 51, in addition to providing the supporting surface 54 for the adjusting sleeve 38 and closing one end thereof against the admission of foreign material, may also serve to divide up the difference in rotation between the adjusting member 38 and the rod 18, the movement of the bearing ring 51 being approximately one-half the difference between the two. Moreover, should the ring become fastened to the rotary member 18 or the sleeve 38, there is still one bearing surface provided.

In operation, when the operating link 7 is moved, say, to the right, the brake beams 3 and 4 are moved sufficiently to cause the application of the brakes (not shown). Should there be an undesirable amount of looseness or slack in the mechanism, the pin 31 engages the arm 32 before the brakes are finally applied causing the turning of the bell-crank lever 28. The movement of the bell-crank lever 28 causes the turning of the adjusting sleeve 38 but the ratchet teeth 43 of the member 42 merely slide over the teeth 44 of the ratchet member 45, being pressed against the same by the spring 57.

When the brakes are released by an opposite movement of the link 7, the pin 31 engages the arm 29 of the bell-crank lever 28, causing the adjusting sleeve 38 to be turned in the opposite direction. The ratchet teeth 43 of the member 42 now engage the ratchet teeth 44 of the member 45 and cause the rotation of the rod 18. As a result, the space between the heads 12 and 13, and consequently the brake beams 5 and 6, is automatically decreased to a desired value, depending upon the spacing between the arms 29 and 32 of the bell-crank member 28. It is noted that the variation in the slack occurs when the brakes are released, thereby decreasing the power necessary to effect the adjustment.

Should it be desirable to shorten the space between the heads 12 and 13 by hand, it is necessary only to move the sleeve 38 axially of the rod 18 in the direction of the head 12 a relatively small distance in order to disengage the ratchet members 42 and 45, whereupon the rod 18 may be readily turned by a wrench secured to the hexagonal portion 49 of the ratchet member 44. When the desired adjustment has been effected, the member 38 may be released from its retracted position, the spring 57 forcing the same forwardly, so that the ratchet teeth 43 of the member 42 are again in engagement with the teeth 44 of the member 45. Such means of adjustment may be easily and quickly effected without the necessity for disconnecting the head 13 from its associated linkage which has heretofore been the practice.

While I have shown only one form of embodiment of my invention, for the purpose of describing the same and illustrating its principles of construction and operation, it is apparent that various changes and modifications may be made therein without departing from the spirit of my invention. I desire, therefore, that only such limitations shall be imposed thereon as are indicated in the appended claims or as are demanded by the prior art.

I claim:

1. In a slack adjuster, the combination with a movable member, of a movable housing sleeve, disengageable clutch means for operatively associating said sleeve and said member, and resilient means operative on said clutch means so positioned as to be housed by said sleeve, said clutch means being rendered ineffective upon a movement thereof against the force of said resilient means, permitting the independent operation of said movable member.

2. In slack adjusting mechanism, a rotatable member, a sleeve surrounding said rotatable member, spaced members supporting the sleeve from the rotatable member, a ratchet clutch having an element secured to the rotatable member and a second element secured to the sleeve between said spaced members, and a light spring extending between the last-named clutch element and one of said members for maintaining said clutch elements normally in engagement with one another.

3. In a slack adjuster, a rotatable member, means combining with the rotatable member to provide an annular chamber surrounding the same, the chamber having a longitudinally shiftable outer wall, co-acting ratchet clutch elements carried by said outer wall and the rotatable element, and a light spring extending between one end of the chamber and the first-named clutch element.

4. In a slack adjuster, a rotatable member, spaced opposed elements carried thereby, one of said members having the inner end thereof formed as one element of a ratchet clutch, a sleeve bearing at its ends upon said members and having secured thereto the second element of the ratchet clutch and a light spring extending between the other of said members and the second element of the ratchet clutch for maintaining engagement of the elements of the ratchet clutch.

ELMER LATSHAW.